Jan. 27, 1959 B. COX ET AL 2,871,289

ERROR-CHECKING SYSTEM

Filed Oct. 10, 1955 5 Sheets-Sheet 1

BONNAR COX
JACOB GOLDBERG
WILLIAM H. KAUTZ
INVENTORS.

BY Lyon & Lyon

ATTORNEYS

BONNAR COX
JACOB GOLDBERG
WILLIAM H. KAUTZ
INVENTORS.

BY Lyon & Lyon
ATTORNEYS

BONNAR COX
JACOB GOLDBERG
WILLIAM H. KAUTZ
INVENTORS.

BY Lyon & Lyon
ATTORNEYS

BONNAR COX
JACOB GOLDBERG
WILLIAM H. KAUTZ
INVENTORS

BY Lyon & Lyon
ATTORNEYS

BONNAR COX
JACOB GOLDBERG
WILLIAM H. KAUTZ
INVENTORS.

BY Lyon & Lyon
ATTORNEYS

United States Patent Office 2,871,289

Patented Jan. 27, 1959

2,871,289

ERROR-CHECKING SYSTEM

Bonnar Cox, Jacob Goldberg, and William H. Kautz, Palo Alto, Calif., assignors, by mesne assignments, to General Electric Company, New York, N. Y., a corporation of New York Application October 10, 1955, Serial No. 539,504

6 Claims. (Cl. 178—23)

This invention relates to data-handling systems and, more particularly, to apparatus for checking the accuracy of the data transfer from a keyboard device into an information-storage device.

One of the means presently employed for transferring data into an information-handling machine is to use an input device having a keyboard. Proper keys on the keyboard are depressed in accordance with the data desired to be transferred into the machine. The keys actuate apparatus which enters the data in code into a storage device such as paper tape, magnetic tape or drum, and the like. These prepared tapes may then be used in the machine or the data is read from them at high speed into the machine. Various arrangements for detecting any errors which may occur in transfer of data in the above-noted manner have been proposed. One of these is to have multiple keyboards with operators typing the same data into each of these multiple keyboards. The various tapes prepared by each one of the keyboards are compared and any differences are noted to indicate errors. This arrangement is rather expensive, since it requires duplicate equipment and results in nonproductive duplicating operators. Another proposed system is to print in human language the data being entered while it is also being written in machine-language form on the paper or magnetic tape. The operator can thereby check what has been set up on the keyboard and compare it with the data from which the keyboard was first set up.

These systems check the data which is being transferred into the machine by the operator. They do not directly check what will be read from the storage device by the machine, because once the input to a storage device has been checked it is assumed the recording is correct and there is no further means provided for determining the correctness of the readout made from this recording.

An object of the present invention is to provide a novel error-detecting system for checking the correctness of the entry of data from a keyboard to an information-handling machine storage device.

A further object of the present invention is to provide a novel error-detecting system for checking the correctness of the data stored in a memory which was entered therein from an input device.

Still a further object of the present invention is to provide a data-entry system from a keyboard to a computer memory which does not require a duplication of equipment.

Yet another object of the present invention is to provide an arrangement for detecting errors in the transfer of data into a memory which checks the proper operation of both the memory input and output systems.

Another object of the present invention is to provide a novel and useful system for detecting errors which can occur upon the transfer of data into a machine or upon the transfer of data out of a machine.

These and other objects of the invention are achieved by providing a first path for the data which is being transferred into the memory of an information-handling machine and by providing a second and different path for the readout of the data which has just been transferred into the machine. Means are provided at the keyboard or input device for comparing the data which has just been transferred into the machine through the first path with the same data which has just been read out from the machine through the second path. Any difference serves to actuate an error indicator. By transferring the data from an input means into the machine in one path and out of the machine in a second path to the input means, not only are errors detected, but also any malfunctioning of apparatus within these paths is also detected. By utilizing the same paths in the machine for error detection as are used for transferring data into and out of the machine, special error-detecting apparatus or arrangements are eliminated.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
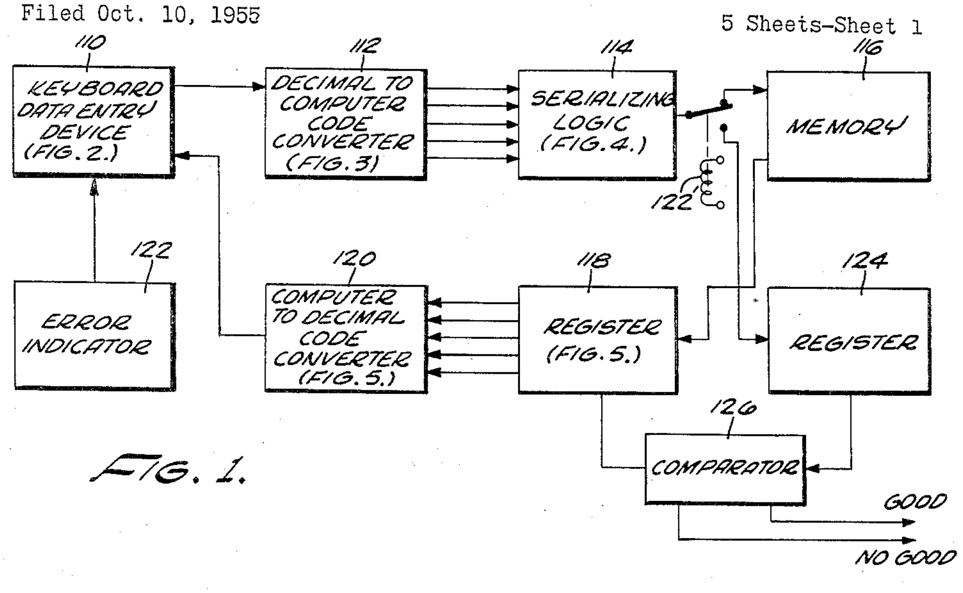
Figure 1 is a block diagram of an embodiment of the invention.

Reference is now made to Figure 1, which shows a block diagram of the invention. To illustrate the principles of the invention, the embodiment described and shown shows an accounting-machine keyboard 110 as a data-entry device and a magnetic drum 116 as the storage into which the data is entered. These are not to be construed as a limitation upon the invention, but merely by way of illustration, since other keyboard-entry devices and storage devices are well known in the art and may be substituted herein without departing from the spirit and scope of this invention. The keyboard-entry machine 110 has a keyboard consisting of a plurality of columns of keys. Each column has keys representative of numbers 1 through 9. The columns are adjacent. The data which is to be transferred to a memory is in decimal form, since the keyboards of the machines themselves are arranged decimally. These keyboards may be the type employed in adding machines or accounting machines, or in double-register printing and adding machines.

More specifically, it is desired to enter data in the form of decimal numbers into the system. Such decimal numbers may represent both numerical numbers and an alpha-numeric code. An alpha-numeric code is one wherein numbers represent letters. In a system wherein the embodiment of this invention was employed, the data consisted of an account number for each separate item, followed by a second number representing the quantity of the number. The data was entered by means of the keyboard in decimal notation.

The information-handling machine which was to use the data employed a type of binary code known as an excess-three code. The excess-three code is one wherein the number 3 expressed in binary notation represents zero. The number 4 represents 1, the number 5 represents 2, etc. The system also employed an even-parity digit check. An even-parity digit check is an arrangement whereby the ones in any binary number are added and their sum plus that of an extra "parity" digit must always equal an even number. In order to arrange for this, there is provided for each binary number an extra-parity digti position. The one is or is not inserted at this extra-parity digit position in order to make the total number of ones in the binary number, including the parity digit, equal to an even number. The following table is presented to show the decimal digits expressed in the excess-three code, with the extreme left-hand digit representing the parity digit. Each digit position is designated by a letter, to make reference thereto simple.

| V | W | X | Y | Z | Decimal Number |
|---|---|---|---|---|---|
| 0 | 0 | 0 | 1 | 1 | 0 |
| 1 | 0 | 1 | 0 | 0 | 1 |
| 0 | 0 | 1 | 0 | 1 | 2 |
| 0 | 0 | 1 | 1 | 0 | 3 |
| 1 | 0 | 1 | 1 | 1 | 4 |
| 1 | 1 | 0 | 0 | 0 | 5 |
| 0 | 1 | 0 | 0 | 1 | 6 |
| 0 | 1 | 0 | 1 | 0 | 7 |
| 1 | 1 | 0 | 1 | 1 | 8 |
| 0 | 1 | 1 | 0 | 0 | 9 |

Decimal numbers which were put into the system incorporating the embodiment of the invention were converted to numbers in the excess-three code. Since each column of keys on the keyboard contains the decimal digits from 1 through 9, the excess-three code contains four binary digit positions for each digit indicated by depressing a key. Accordingly, a decimal number which has a value in the hundreds is expressed by 15 binary digits, which includes three parity digits.

The output from the keyboard consists of decimal data representative of the decimal number expressed by depressing the keyboard keys. This decimal number must then be converted to the code to be employed in the information-handling system. For this purpose a decimal-to-computer code converter 112 is employed. This converter provides an output consisting of binary numbers which are expressed in the excess-three binary code and which have the parity digit added. There will be five binary digits for each key depressed on the keyboard. A parallel computer is one wherein the numbers handled by the machine all exist substantially simultaneously in parallel tracks or channels in the system. A serial computer may have the code numbers arranged in serial form. With the parallel system, the output of the decimal-to-computer code converter may be recorded directly on a plurality of parallel tracks which exist in the recording medium. For reasons which need form no part of this record, it was preferred to employ serial handling of the coded data.

Accordingly, the output of the decimal-to-computer code converter was applied to a network represented by the block 114, which is called the serializing-logic block. This serves the purpose of taking the parallel input and converting it to a serial form. After such conversion, the serial code is recorded in a memory 116. This may be the computer memory or it may be a tape from which entry into the memory is to be made. The type of memory used in the system depends upon the requirements and purposes of the memory. In the preferred system, a magnetic drum was employed and the data was recorded serially in tracks on the magnetic drum. The drum was the memory for the system.

In view of the fact that these information-handling machines are finding employment in business in the form of inventory-control machines and the like, it is necessary to definitely ascertain that the data stored for future reference is an accurate expression of the data which was punched on the keys of the keyboard. In accordance with this invention, after such storage the data which has just been stored is read out from the memory into a register 118.

The register serves the purpose of staticising the memory output. By staticising is meant that the serial pulse train which is produced from the output of a magnetic reading head positioned over the proper track of the drum is converted to a number of D. C. levels existing simultaneously which are representative of serial code in parallel form. The output of the register is applied to a code-converting block 120, which is referred to as a computer-code-to-decimal code converter. This arrangement converts the excess-three code back to decimal form. In decimal form the data may be compared directly with the data which is punched into the keyboard, and any differences are indicated by an error indicator 122.

The advantages of the arrangement described are that no duplicate apparatus is required for checking. The input path is the normal one which is employed for entry of all data. The output path, as will be shown subsequently, is the one which is employed for data output in the event it is desired to read out data which has been previously stored on the memory and to print it in a form whereby it may be read. Machines having facilities for printing the numbers which are indicated on the keys which are depressed are well known. These printing adding machines or printing accounting machines are also commercially purchasable. Accordingly, a keyboard having these printout facilities may be readily employed for the purpose of printing out data which is stored.

In Figure 1, a relay 122' is shown between the output of the serializing logic and the input to the memory. When in the nonactivated condition shown in Figure 1, the relay contacts enter data from the keyboard into the memory. When in the activated condition, the contacts are closed so that incoming data, instead of being entered into the memory from the keyboard, will be entered into a second register 124. A comparator 126 can compare the data in the first register 118 with the data in the second register 124 and indicate whether a difference exists. The purpose of this arrangement is to check the data printed out by the keyboard from the memory to determine whether these agree.

The system operates in the following manner to provide this result. Relay 122' is actuated when it is desired to print out data from the memory through the keyboard. Data passes from the memory to register 118 where it is staticised and then converted to keyboard code by the code converter 120. From the code converter, it is applied to the keyboard and serves to depress or rather pull down those of the keys which correspond to the data which has been read out from the memory. When the keys are depressed, they supply output data in the manner previously described to the decimal-to-excess-three converter 112. This data is then serialized, and, by virtue of the actuated relay 122', is entered into the register 124. The comparator 126 then serves to compare the data in the two registers to determine whether a difference exists. Thus, the data-output path from the memory is checked against the data-input path to the memory for correspondence, while simultaneously determining the correctness of the transfer of data. Again, there is no redundancy of apparatus required. The checking of the data transfer, using two different paths, employs apparatus already required by the system, thus affording both economy and speed.

Figure 2:
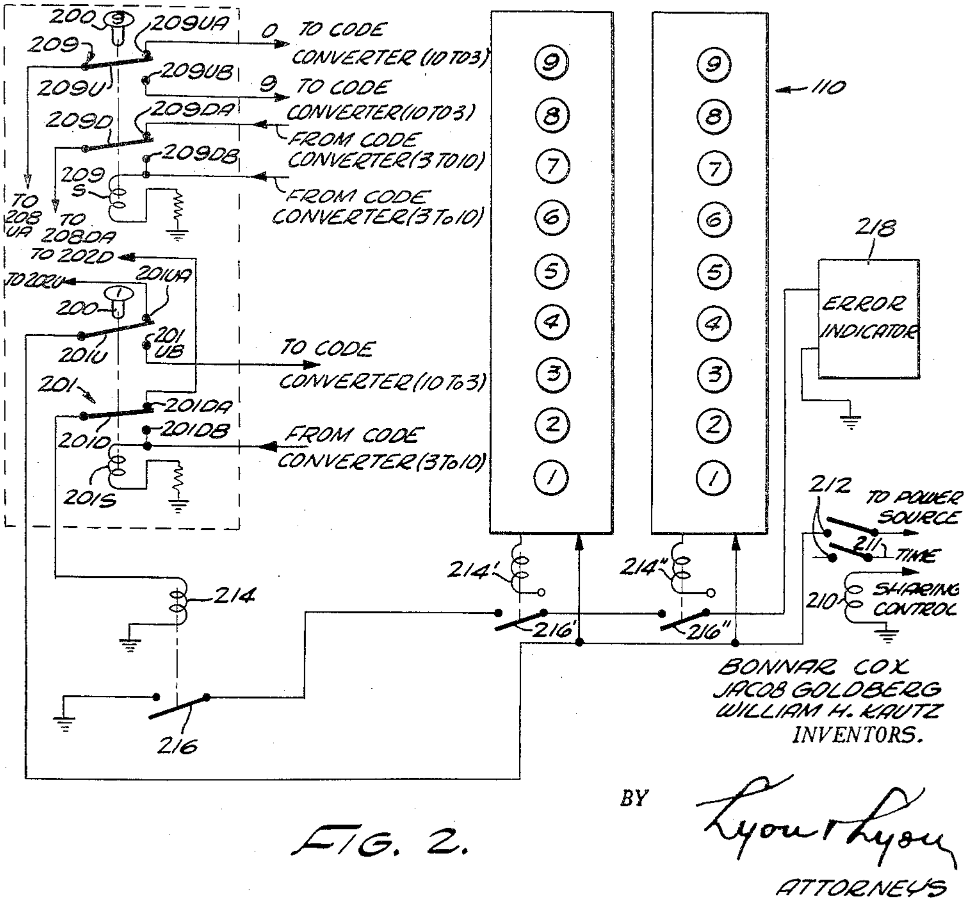
Figure 2 is a schematic diagram of the switching arrangement at the keyboard used in the embodiment of the invention.

Reference should now be made to Figure 2, showing a keyboard switching arrangement whereby checking in the manner described in Figure 1 is made possible. Three columns of keys are shown, with the circuit for keys 1 and 9 in one column being shown in detail. The remaining columns of keys of the keyboard have identical arrangements to those shown. The arrangements are not shown for the remaining intervening keys 2 through 8, in order to preserve simplicity in the drawing. However, the arrangements for these intervening keys are identical with those shown and will be further clarified by the following explanation.

Each key 200 has operatively associated therewith a double-pole double-throw switch 201, 209. One of these switch arms 201U, 209U moves between two terminals 201UA, 201UB—209UA, 209UB, and the other of these switch arms 201D, 209D, likewise moves between two terminals 201DA, 201DB—209DA, 209DB. The position of the switches shown in the drawings is the one assumed when the keys are not depressed. The switch arms contact the upper, or A, terminals. When a key is depressed, the switch arms make contact with the lower, or B, terminals, and the depressed key is also mechanically latched in place by a latch (shown in Figure 6), which is only released after the operator is apprised that no error has occurred in data entry. A solenoid 209S, 201S is provided for each key, which has the ability, when energized, to pull down both the associated key and its associated contacts.

The upper switch arm 209U—for each of the keys numbered from 9 to 2—is connected to the upper terminal—201UA of switch—201 associated with the key which is immediately below it in decimal value. For example, the upper contact 209U of the 9-key switch 209 would connect with the upper terminal 208UA of the 8-key switch 208 (not shown), etc. Finally, the upper arm 202U of the switch associated with the 2-key is connected to the upper terminal 201UA of the 201 switch. The upper contact 201U of the switch 201 associated with the 1-key connects to the contacts 212 of a relay-operated switch 210. This relay-operated switch is employed for applying current from a power source to the switches of the keyboard through the contacts 212 when it is desired to make an entry from the keyboard into the information-handling machine. In the event that a plurality of keyboards are employed, the relay 210 enables a keyboard time-sharing operation to be performed so that entry from each of the keyboards into the machine may be made in a desired sequence. It should be noted that when no keys in a column are depressed the power source is connected directly to 209UA and from there to the code converter, where, as will be shown later, a zero is generated in excess-three code. It will be appreciated that only one key in a column may be depressed for an entry. This is no restriction, since this is the mode of operation of these types of keyboard machines today.

The upper terminal 209UA is connected to the code converter, and, when it is energized from the power source by way of switch arm 209U and the contacts and switch arms of the remainder of the column of keys, a zero is generated by the code converter. This occurs only when no keys in a column are depressed, which is the same as requiring a zero in that column (where no keys are depressed). Accordingly, the arrangement shown is capable of generating a zero signal where required. Were any one of the keys depressed, the circuit from the power source to contact 209UA would be broken. For example, depressing the 9-key 200 causes arm 209U to make contact with terminal 209DB and arm 209D with 209DB. Thus, terminal 209UB will be energized when relay 210 is actuated, and the code converter will generate a nine in excess-three code in response thereto. If the 1-key were depressed instead of the 9-key, arm 201U would contact terminal 201UB. Thus, this terminal will be energized when relay 210 is actuated, and the code converter will generate in response thereto a one in excess-three code. The effect of the operation of any of the intervening keys is to energize a corresponding one of ten leads to the code converter which provides an output in excess-three code corresponding thereto. If two keys are inadvertently depressed, then the code converter will only receive signals from the lower one in decimal significance, since depression of the lower-numbered keys breaks the continuity from the relay 210 to the higher decimal keys.

The terminal 209DA should receive an output from the computer-code-to-decimal-code converter 120 if the input thereto was a zero. Terminal 209DB should receive an output from the code converter 120 if a nine was read from the memory. The one of the DB terminals which receives an output from the code converter 120 is the one which is associated with the number which is read out from the memory. Thus, if the number one is read into the code converter, then contact 201DB should receive an output current. At this time, it should be recalled that input into the system is performed by pushing down a key in each column where required, and then actuating the relay 210. The depressed keys are held down by a mechanical latch. Accordingly, when the entered data is read out again into the register and then into the code converter 120, the code-converter output should correspond to the input from the keyboard.

The one of the ten lines from the code converter to each column which is excited must be connected to a terminal (209DA or one of the remaining DB terminals) which is associated with the key which was initially depressed, if there are no errors. Thus, if the 9-key were originally depressed, then the line from the code converter connected to terminal 209DB is excited when the memory is read for checking. The switch arm 209D serves to connect terminal 209DB through the DA terminals and D switch arms of the switches associated with the lower numbered keys to the error relay 214. It is noted that solenoid 209S is thus connected in parallel with relay 214. The impedances of the coils are made such that the amount of current flowing through the solenoid coils is insufficient to enable the solenoid to pull down on the key. However, the current is sufficient to actuate the alarm relay 214. There is an alarm relay 214′, 214″ for each column of keys. These relay contacts 216, 216′, 216″ are connected in series so that, if there is no error, all these relays are excited and a continuous connection is made from ground to the error indicator 218. The error indicator will indicate by lighting or by extinguishing a light that no error is present in the data entered and in the readin and readout circuits. This may be achieved in any suitable manner by having a relay excited when the continuous connection is made by the relay contacts 216. If desired, the error indicator may be made to lock up the keyboard to prevent further entries until the source of an error is corrected. If a circuit is not made between an excited DB terminal and the alarm relay by reason of an error, when output from code converter 120 is received, then this output is sufficient to enable the solenoid associated with the excited DB terminal to pull down the associated key. Two error conditions may occur. Either the number being returned from the memory is higher than the one entered by the depressed key, or the number being returned by the memory is lower. In the case when the number is higher, continuity between the 209DA, or the DB, terminal which is excited and the alarm relay is broken, since the switch arm D associated with the manually depressed key will not be in contact with its DA terminal, as is required. Should the number returned from the code converter be lower than the one entered by the manually depressed key, the same situation is present and the alarm relay is not actuated. In either instance, the operator can readily see the second key in a column which has been pulled down, and is thereby further apprised of the fact that an error has occurred and what the nature of the error is. Thus, the keyboard indicates that the data which has been entered into the system is correct, the system is functioning properly, and, also, if it is functioning improperly, the nature of the error.

For printout purposes, a solenoid 201S—209S in each column is actuated in accordance with the data read out from the memory. Thus, one key and the associated contacts will be pulled down in each column. This data may be entered, in turn, into the decimal-to-computer code converter 112 by energizing relay 210 and, as described for Figure 1, the comparator 126 will provide an indication as to whether the printed-out data is identical with that recorded in and read from the memory.

Figure 3:
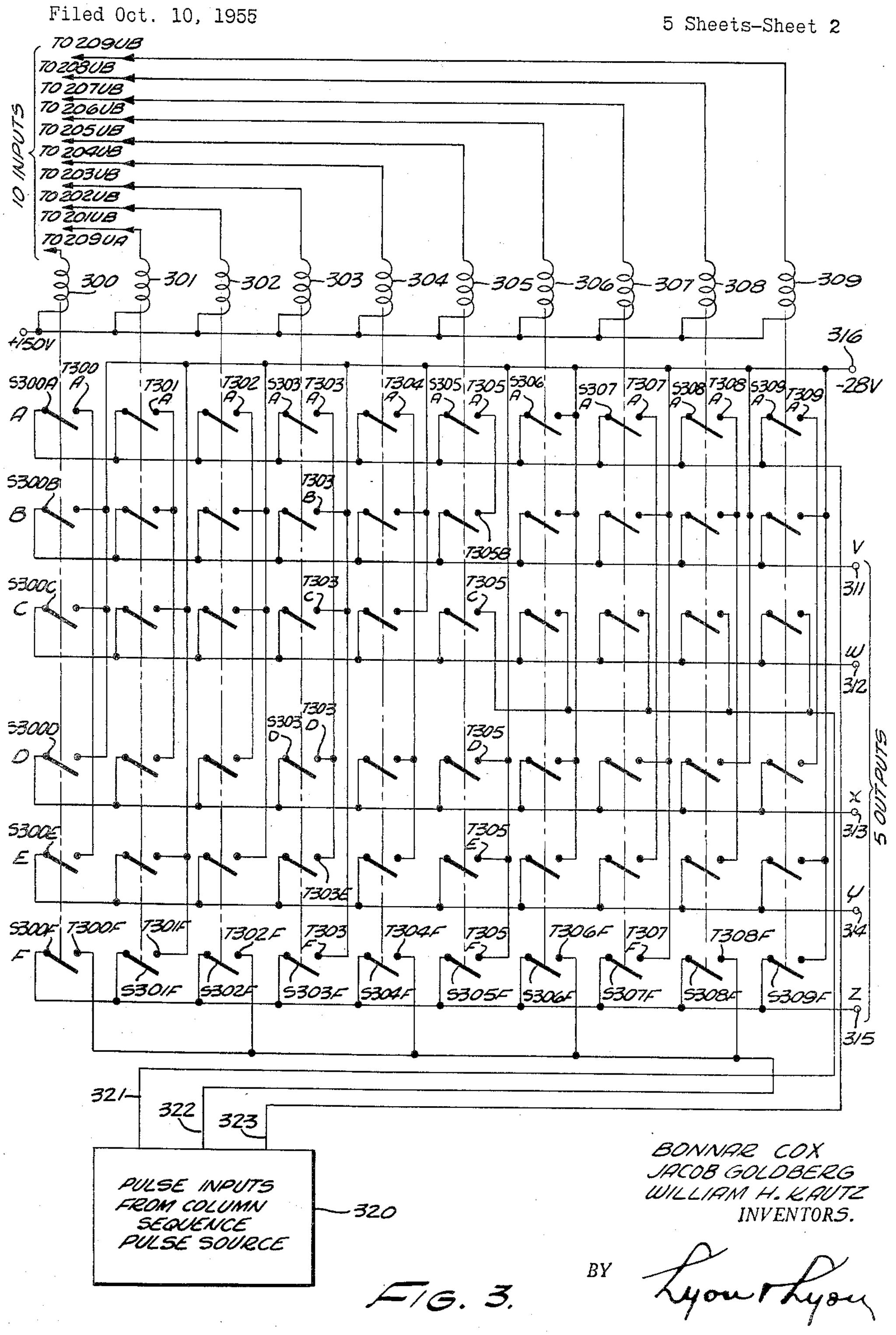
Figure 3 is a circuit diagram of a novel decimal-to-excess-three coding arrangement which is employed in the embodiment of the invention.

Each column of the keyboard connects to a relay network of the type shown in Figure 3. Accordingly, there will be as many of these networks as there are keyboard columns. This network serves the function of converting the decimal-designated digit in a keyboard column to an excess-three coded binary number plus the required parity digit. Since the system being described herein is for a serial operation, it will be necessary for the purpose of preserving the proper significance of the numbers to preserve the position of each digit in a number. For example, a decimal number in the hundreds consists of three decimal digits. Each of these is represented by a binary number. The sequence of these binary numbers in the serial system is arranged to preserve the significance of the original decimal number digits. Accordingly, although the output from the keyboard will be presented to the respective code converters for each column simultaneously, the output from the code converters will be sequenced to preserve digit significance when put in serial form.

The ten leads from the UB terminals (and 209UA) in each column connect with a separate relay coil, respectively designated as 300, 301 through 309, to show correspondence with the leads from the terminals associated with each key. Each relay coil drives six normally open contacts A, B, C, D, E, F. These contacts are interconnected in a manner so that when any one of the coils 300 through 309 is excited responsive to a key on the keyboard being depressed the contacts closed as a result of such excitation enable the application of potentials to the terminals 311, 312, 313, 314, and 315, which have also been designated by the letters V, W, X, Y, and Z, to correspond with the ones employed to designate digit positions in the table previously shown herein. These potentials are representative of the excess-three code and parity digit corresponding to the decimal digit indicated by the depressed key. A zero on any one of the output terminals is signified by the existence of a negative voltage which is applied to the converter at the terminal 316.

In order to insure the proper significant position of the coded number for a column as described previously, as well as the significant position of the ones in a binary number, after one of the relay coils 300 through 309 has been closed, the converter networks are read in a serial sequence corresponding to digit significance. Actually, the reading of each converter network consists of applying three pulses in sequence from a column-sequence pulse source 320. This serves to provide a binary number output at the V, W, X, Y, and Z terminals, least significant digit first. If it is so wished, the code conversion network may have a pulse applied to the three leads 321, 322, 323 simultaneously, instead of in 321, 322, 323 sequence.

The nomenclature adopted in describing the code converter network is as follows. Each relay coil 300—309 controls six normally open contacts A, B, C, D, E, F. These are more specifically designated by the coil number and contact letter. Further, each contact consists of a swinger and a terminal. Thus, exciting coil 303 causes swingers S303A through S303F to respectively make contact with terminals T303A through T303F.

The connections to the relay contacts from the negative-voltage terminal 316 are made as follows: From terminal 316 to terminals T300B, T300C, and T300D. From terminal 316 to terminals T301C, T301E, and T301F. From terminal 316 to terminals T302B, T302C, and T302E. From terminal 316 to terminals T303B, T303C, and T303F. From terminal 316 to terminals T304B and T304C. From terminal 316 to terminals T305D, T305E, and T305F. From terminal 316 to terminals T306B, T306D, and T306E. From terminal 316 to terminals T307B, T307D, and T307F. From terminal 316 to terminal T308D. From terminal 316 to terminals T309B, T309E, and T309F.

Output from the column-sequence pulse source 320 occurs on three output lines. The first 321 of these three output lines connects to terminals T305C, T306C, T307C, T308C, T309C. The second output line 322 connects to terminals T300F, T302F, T304F, T306F, and T308F. The third output line 323 connects to the swingers S300A through S309A. Terminal T300A connects to terminal T300E. Terminal T301A, T301B, and T301D are connected together. Terminals T302A and T302D are connected together. Terminals T303A, T303D, and T303E are connected together. Terminals T304A, T304B, T304C, T304D, and T304E are connected together. Terminals T305A and T305B are connected together. Terminals T306B, T306D, and T306E are connected together. Terminals T307A and T307E are connected together. Terminals T308A, T308B, and T308E are connected together. Terminals T309A and T309D are connected together. Output terminal 311 connects to the swingers S300B through S309B. Output terminal 312 connects to swingers S300C through S309C. Output terminal 313 connects to swingers S300D through S309D. Output terminal 314 connects to swingers S300E through S309E. Output terminal 315 connects to swingers S300F through S309F.

Referring to the table, the number five in the code being employed is expressed as 11000. To illustrate the operation of the code-converter network, assume that five key in a column is depressed. Thus relay coil 305 will be energized, closing all the relay contacts controlled thereby. The first-pulse output from the column-sequence pulse source may be traced to terminal T305C and through swinger S305C to output terminal 312, thus representing a one at the W position. The second-pulse output from the column-sequence pulse source is not applied to any of the contacts of the 305 relay. The third-pulse output from the column-sequence source is applied to swinger S305A, through terminal T305A, to terminal T305B, thence through swinger S305B to output terminal 311. Thus, there is a one at the V position. Swinger S305D connects to the negative-voltage-source terminal 316 when it closes, thereby applying a zero-signal to output terminal 313. Swingers S305E and S305F are similarly connected to the negative-voltage source, also thereby applying zero-signal outputs to terminals 314 and 315. Thus, the number 11000 is generated by the code converter in response to an excitation of a lead by the five-key on the keyboard. The manner of operation of the converter network in response to depression of others of the keys should be apparent now.

From the above, it may be seen how, by depressing a key on the keyboard, a relay in the code converter associated therewith is actuated to close contacts. These contacts are interconnected in a manner whereby at the proper time in a columnar-sequencing arrangement signals appear at output terminals, which signals are a representation in an excess-three binary code of the decimal-digit signal received from the keyboard. As previously stated, there is one of the code converters shown in Figure 3 required for each separate column. The outputs of all the code converters are applied to a serializing-logic network, which is shown schematically in Figure 4.

Five Or gates 400, 402, 404, 406, and 408 are employed as the input to the serializing-logic arrangement. Input to Or gate 400 consists of the output from the terminals 311, or the binary digits in the V position, of each one of the code converters employed. Or gate 402 has the output from all of the 312 terminals, or the W-digits, applied thereto. The input to Or gate 404 is the output from all the 313 terminals, or the X-digit positions. The input to Or gate 406 is the output from all of the 314 terminals, or the Y-digit positions. The input to Or gate 408 is the output from all of the 315 terminals, or the Z-digit position.

From the previous description, it will be appreciated that the signals from the various code converters are sequenced so that at no time are there more than one of the V, W, X, Y, or Z-digit present as input to the respective Or gates. The Or gate outputs are amplified by amplifiers 410 through 418. The amplifier outputs are applied to respective And gates 420 through 428. A second input to the respective And gates is derived from a serializing counter 430. The And gates do not provide an output unless both of their inputs are excited simultaneously. Accordingly, the serializing counter enables each one of the And gates to provide an output in sequence if their other input leads are excited from the Or gates.

In order to properly serialize the digits, the serialization should proceed in accordance with timing pulses, which may be derived either from a master clock-pulse source for the entire information-handling machine to which all sequencing operations as well as performance of routines are synchronized. Alternatively, and the more common practice, is to derive from either the drum or tape memory a timing pulse or clock pulse which is employed to sequence operations which either derive data from it or write data into the memory. An arrangement for doing this is shown in a patent to Brustman et al., Pat. No. 2,702,380, titled Data Translating System. Accordingly, as the counter is sequenced, output is received from each one of the And gates 420 through 428, to which a pulse representative of a one is applied, which output is applied to a common Or gate 434. Output from this Or gate is amplified by an amplifier 436 and then applied to a flip-flop 444, through an And gate 438, and through an inverter 440 and a gate 442. The And gate 438 receives as its second input signals from the clock-pulse source. When a "one" pulse is received from the amplifier 436, the flip-flop 444 is driven to its set condition through And gate 438. Inverter 440 inhibits, or holds closed, gate 442. When no "one" pulse is received, gate 442 can reset flip-flop 444 when a clock pulse occurs and since it is no longer inhibited. The flip-flop 442 will be set or reset, in accordance with the ones and zeros of a number. The output from the flip-flop is then applied to the writing apparatus, which may be through amplifiers to the proper writing head of magnetic tape or drum.

Figure 4:
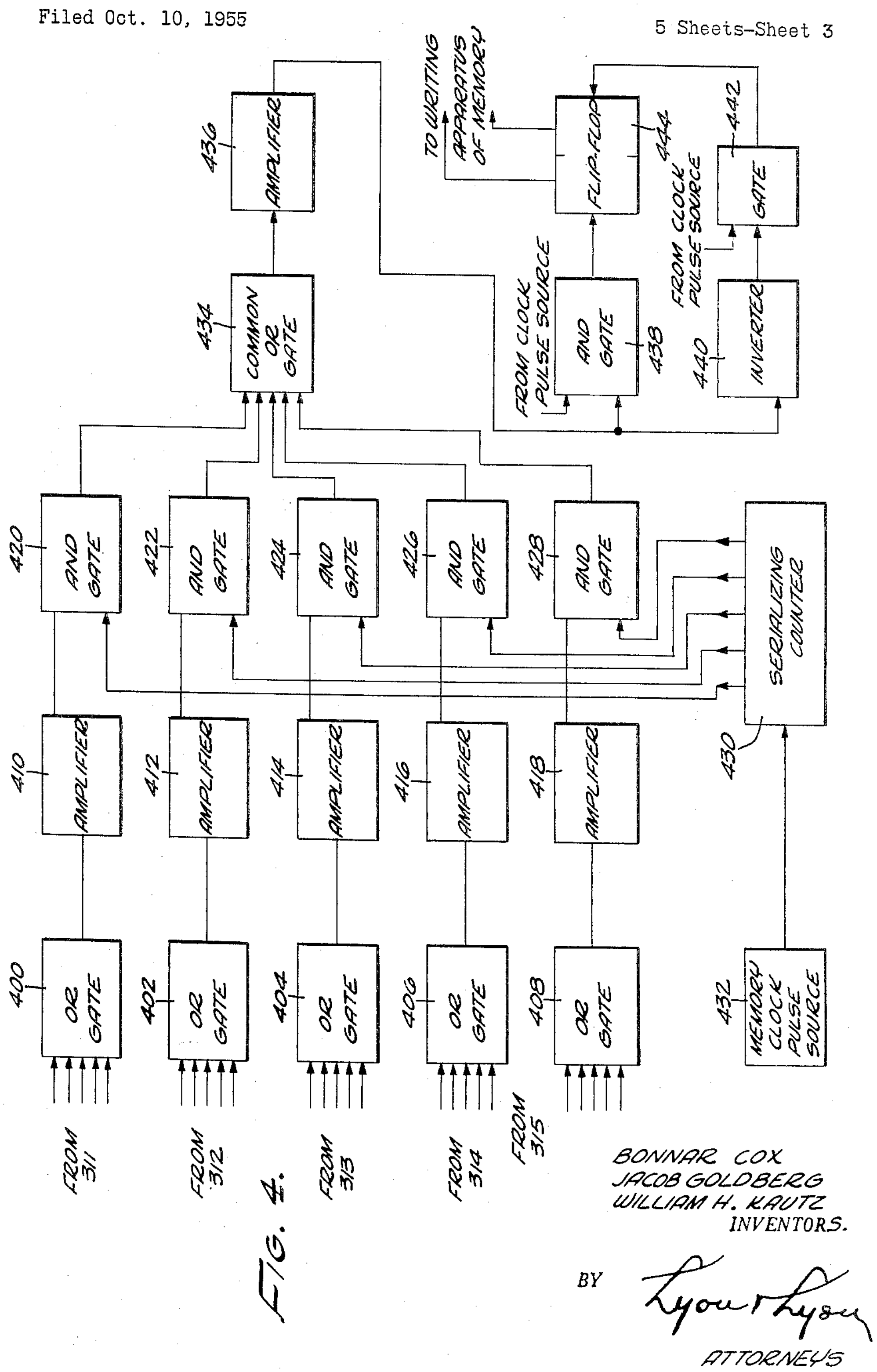
Figure 4 is a block diagram of the serializing logic which is employed in the embodiment of the invention.

The arrangement described and shown in Figure 4 is not being claimed in the present invention, being one of many possible methods for serializing data derived from a plurality of pulses in substantially parallel form. As previously stated, the sequence of columnar number presentation is actuated by the column-sequencing pulse source 320 at the code converter. This insures that only one binary number is applied to the serializer at a time and that binary number is in the proper digit position timewise, corresponding to the original decimal-number digit. The serializing logic then puts these in serial sequence for writing into the memory. A description of the writing and reading techniques employed to store and read digital data in a memory will not be provided, since these techniques are well known and are employed in many of the present-day digital computers and information-handling machines. The And gates and Or gates are also well-known circuits, being otherwise respectively known as coincidence gates and buffer gates. Suitable circuitry is described, for example, in Chapter 4 of High-Speed Computing Devices, a book by Engineering Research Associates, which was published by the McGraw-Hill Book Company in 1950.

Accordingly, after the data has been transferred from the serializer network into the memory, a readout operation is commenced. This operation is a readout serially of the data which has been written serially. This serial data is entered into the shift register 118. Shift registers are well-known circuits. One suitable register which may be employed and into which data from the memory may be transferred may be found described and shown in detail in an article by Stevens and Knapton which was published in the magazine Electronics, pp. 181–184, November 1949, and entitled Gate Type Shifting Register.

Figure 5:
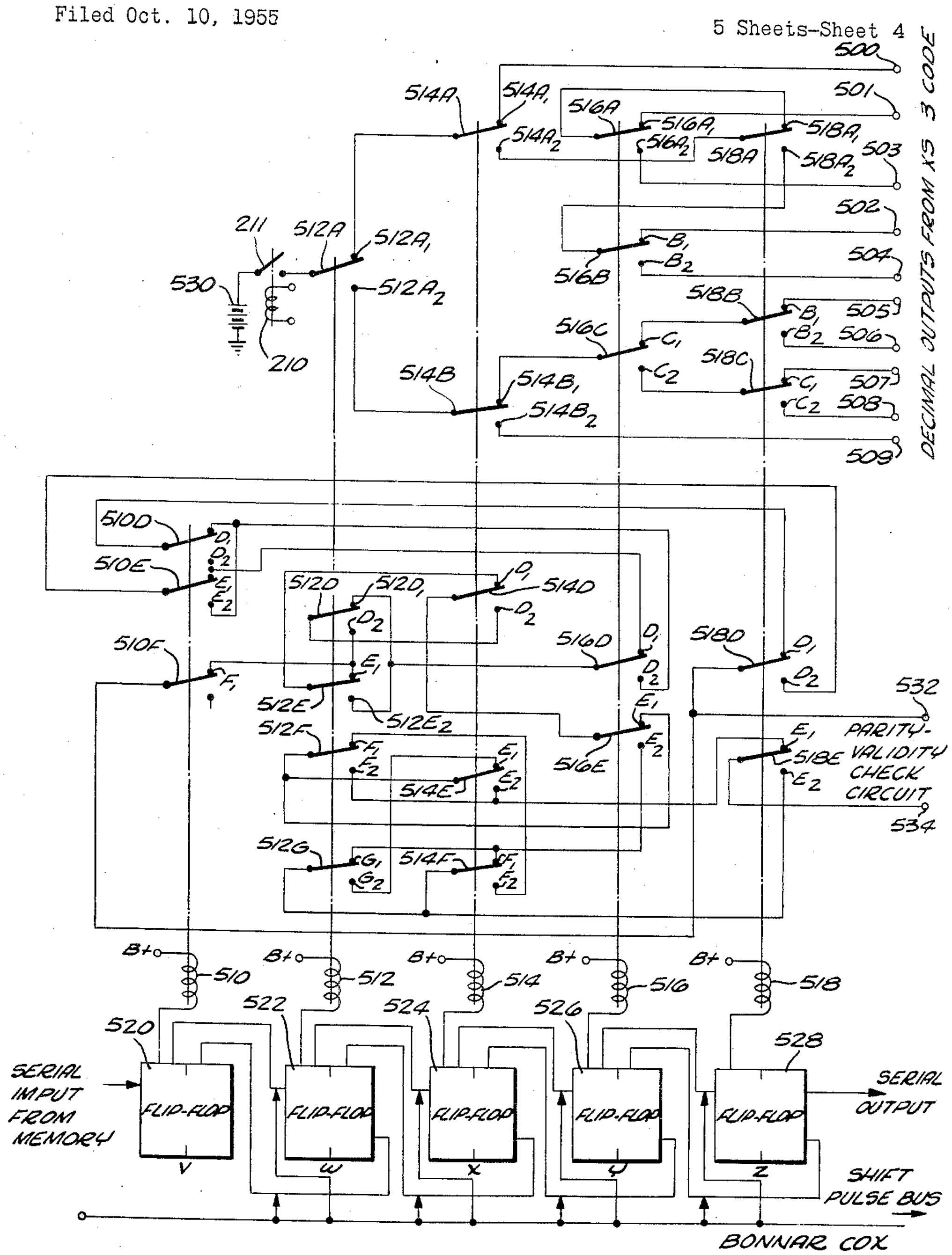
Figure 5 is a schematic diagram of a novel excess-three-to-decimal code converter and code validity checker which is employed in the embodiment of the invention.

As shown in Figure 5 in block-diagram form, this register consists of a plurality of flip-flops of which five stages 520, 522, 524, 526, and 528 are shown by way of example. These flip-flops are connected in series in a manner so that a binary digit which is transferred into the first of them 520 can be shifted by application of pulses to the shift-pulse bus to the succeeding flip-flops. Accordingly, a digit which is read from the memory is entered into the first flip-flop. Then a pulse is applied to the shift-pulse bus to transfer the digit to the second flip-flop 522, prior to the next digit being read from the memory. The next digit is entered into the first flip-flop from the memory. The next shift pulse applied to the bus transfers the two digits to the succeeeding flip-flops in the series, thus emptying the first flip-flop 520. Thus, as the digits are read from the memory, they are entered into the register and then shifted along the series of flip-flops until a complete binary number, corresponding to a decimal digit, is held in the register.

Shown in Figure 5 are five flip-flops of a register which are used to store the five digits of the code employed in the system. These five digits, as previously indicated, represent the number which was punched on one key of the keyboard in a column. There will be one of these five-bit registers for every binary number forming the decimal numbers which are entered into the memory. These are connected to receive the successive binary-number outputs from the memory. The register shown in Figure 5 is representative of the type of register which may be employed for register 118 and register 124 shown in Figure 1. A suitable comparator 126 for comparing these register outputs is described and shown in a patent to Woolard, Pat. No. 2,641,696.

For each five-bit register, a separate code converter is required to convert from the excess-three binary code to the decimal code. As shown in Figure 5, such a code converter comprises five relays, 510—518, with their respective coils connected to be actuated by a different flip-flop when that flip-flop stores a "one." These relays have their contacts interconnected in a manner so that closing of the relays in accordance with the binary number in the register will enable current to flow from a source 530 through the relay contacts to the proper one of ten output terminals 500–509. These ten output terminals are respectively connected to terminals 209DA and 209DB through 201DB which are associated with a column of keys on a keyboard. This may be seen by referring to Figure 2.

Entry into the register, of a binary number, is made at a rate which is too high for the relays to follow. Accordingly, it is not until a register is filled and the number therein is maintained for a time that the relays can begin to operate in response to the "ones" in the binary number in the register. The flip-flops are set with one or the other side having a high potential in accordance with the binary number entered therein from the memory. The relay coils 510, 512, 514, 516, and 518 are coupled to the "one" sides of the respective flip-flops, so that any flip-flop in the register which is in its "one" condition will energize the relay coil coupled thereto. The relay coil thus energized will close its associated contacts to permit current to flow to the one of the output terminals which is a decimal manifestation of the binary-number input. Thus current is allowed to be applied to the solenoid in the keyboard which is associated with a correspondingly numbered key in the column for which the decoder has been provided.

The interconnections of the relays to achieve code conversion are described below. Relay 518, for code conversion, has three double-pole double-throw contact arrangements. The swingers, or movable arms, are designated as 518A, 518B, and 518C. The upper terminal associated with each movable arm will be respectively designated as 518$A_1$, 518$B_1$, and 518$C_1$. The lower terminal associated with each movable arm will be respectively designated as 518$A_2$, 518$B_2$, and 518$C_2$. Relay 516 for code conversion also has at least three single-pole double-throw contact arrangements, respectively designated as 516A, 516B, 516C. The upper terminals associated with the respective movable arms are designated as 516$A_1$, 516$B_1$, 516$C_1$. The lower terminals associated with the respective movable arm are designated as 516$A_2$, 516$B_2$, 516$C_2$. Relay 514 has two single-pole double-throw arrangements. The movable arms are designated by 514A, 514B. The upper terminals associated with the respective movable arms are 514$A_1$ and 514$B_1$. The lower terminals are respectively designated as 514$A_2$ and 514$B_2$. The relay 512 has a single-pole double-throw contact arrangement with a movable arm 512A, an upper terminal 512$A_1$ and a lower terminal 512$A_2$. Relay 210, it will be recalled, is the time-sharing, or power-applying, relay for a keyboard. It has a set of contacts 211, which are closed when a keyboard is energized to connect power from the source 530 to the swinger 512A.

The terminal 500 is connected to terminal 514$A_1$. Movable arm 514A is connected to terminal 512$A_1$. Movable arm 512A is connected to contacts 211. Terminal 501 is connected to terminal 516$A_1$. Movable arm 516A is connected to terminal 518$A_1$. Movable arm 518A is connected to terminal 514$A_2$. Terminal 518$A_2$ is connected to movable arm 516B. Terminal 516$B_1$ is connected to output terminal 503. Output terminal 502 is connected to terminal 516$A_2$. Output terminal 504 is connected to terminal 516$B_2$. Output terminal 505 is connected to terminal 518$B_1$. Movable arm 518B is connected to terminal 516$C_1$. Movable arm 516C is connected to terminal 514$B_1$. Output terminal 506 is connected to terminal 518$B_2$. Output terminal 507 is connected to terminal 518$C_1$. Movable arm 518C is connected to terminal 516$C_2$. Output terminal 508 is connected to terminal 518$C_2$. Output terminal 509 is connected to terminal 514$B_2$.

By way of illustrating the operation of the converter, let it be assumed that the binary number 11000 (5) is staticized in the register. This means that flip-flops 520 and 522 are storing "ones." Accordingly, relays 510 and 512 are excited and the remaining three are not. This results in movable arm 512A contacting terminal 512$A_2$, and a circuit is made to terminal 505 from the power source 530 through contacts 211 when relay 210 is energized, through terminals 512$A_2$, 514$B_1$, 516$C_1$, 518$B_1$, to terminal 505. From this, the mode of operation of the arrangement to decode should be clear, and it should be apparent how the coding network operates to provide a decimal output for an excess-three binary coded input.

Another function may be derived employing these same five relays by having extra contacts which may be interconnected to afford a validity check of the excess-three code employed. It will be appreciated that five binary digits may present $2^5$ equal to 32 different possible code combinations. However, only 10 of these are actually employed here. That is, there are only 10 meaningful code combinations. With the arrangement of the D, E, F, and G contacts shown in Figure 5, when any one of these 10 meaningful combinations are employed to excite the five relays, a circuit may be traced from terminal 532 through the contacts and back out through terminal 534. The closing of this circuit may be employed to indicate that a valid code combination is being converted into decimal code.

Substantially similar nomenclature is employed for the movable arm and contact arrangements. Thus, a connection may be traced from terminal 532 to movable arm 518D and also to movable arm 510F. Terminal 534 connects with movable arm 518E. Terminal 518$D_1$ connects with movable arm 510D. Terminal 518$D_2$ connects with movable arm 510E. Terminal 518$E_1$ connects with terminal 512$F_2$. Terminal 518$E_2$ connects with movable arm 514F and also with movable arm 512G. Movable arm 516D connects with terminals 512$D_1$ and 512$E_2$. Terminal 516$D_1$ connects with terminals 510$D_2$ and 510$E_1$. Terminal 516$D_2$ connects with terminals 510$D_1$ and terminal 510$E_2$. Movable arm 516E connects with movable arm 514D. Terminal 516$E_1$ connects with movable arm 514E and movable arm 512F. Terminal 516$E_2$ connects with terminal 512$G_1$. Terminal 514$D_1$ connects with movable arm 512E. Terminal 514$D_2$ connects with movable arm 512D. Terminal 514$E_1$ connects with terminal 512$G_2$. Terminal 514$E_2$ is connected to terminals 512$F_2$ and 518$E_1$. Terminal 514$F_1$ is connected to 512$G_1$. Terminal 514$F_2$ is connected to 512$F_1$. Terminal 512$D_2$ is connected to terminal 512$E_1$ and terminal 510$F_1$.

To show the operation of this arrangement, the binary number 11000 (5) will again be used. Movable arms 510D through F and 512D through G close on their respective lower terminals when the relay coils 520, 522 are excited. Thus, a path may be traced from terminal 532 through movable arm 518D, terminal 518$D_1$, to movable arm 510D, terminal 510$D_2$, to terminal 514$D_1$, movable arm 514D, through movable arm 516E, terminal 516$E_1$, to movable arm 512F, to terminal 512$F_2$, through terminal 518$E_1$, movable arm 518E, to terminal 534.

Any one of the code combinations other than the ones shown in the table herein will not close the circuit between terminals 532 and 534, whereby a warning of an incorrect code may be obtained. From the code converter the path may easily be traced back to the solenoids 214 associated with each of the keys. It should also be noted that the code converter and validity checker provide a correct output even though the parity digit is one of those forming the input number.

Thus, to review again, the operation of the system, one key in each column of a keyboard containing the numerals from 1 through 9 may be depressed to represent numbers having code significance. These numbers are applied from the keyboard to a decimal-to-computer code converter. This consists of an arrangement of ten relays for each column which converts a decimal digit to an excess-three binary-coded digit with an extra parity digit. By pulsing the contact arrangement which is closed from the keyboard, the binary-coded numbers are applied in columnar sequence to a serializing-logic arrangement. The output of this serializing-logic arrangement consists of a train of binary digits in series. These are then entered into the memory. Upon completion of such entry, the memory reads these digits out serially into a shifting register, which has the property of staticizing these digits so that the binary numbers are presented in parallel form.

These numbers are then used to energize five relays performing with their contacts a binary-to-decimal converter. The outputs from these contact arrangements are respectively connected to the contacts of the column on the keyboard associated with the converter. In each column a path to a checking relay is energized as a result of the output of the code converter, if the contacts at the relay are already closed by virtue of the previous key actuation. Then the check is completed and a correct signal is provided. If this is not the case, however, the existence of an error is indicated. A further relay contact arrangement is also provided which checks the validity of the code number.

Figures 6, 7, 8:
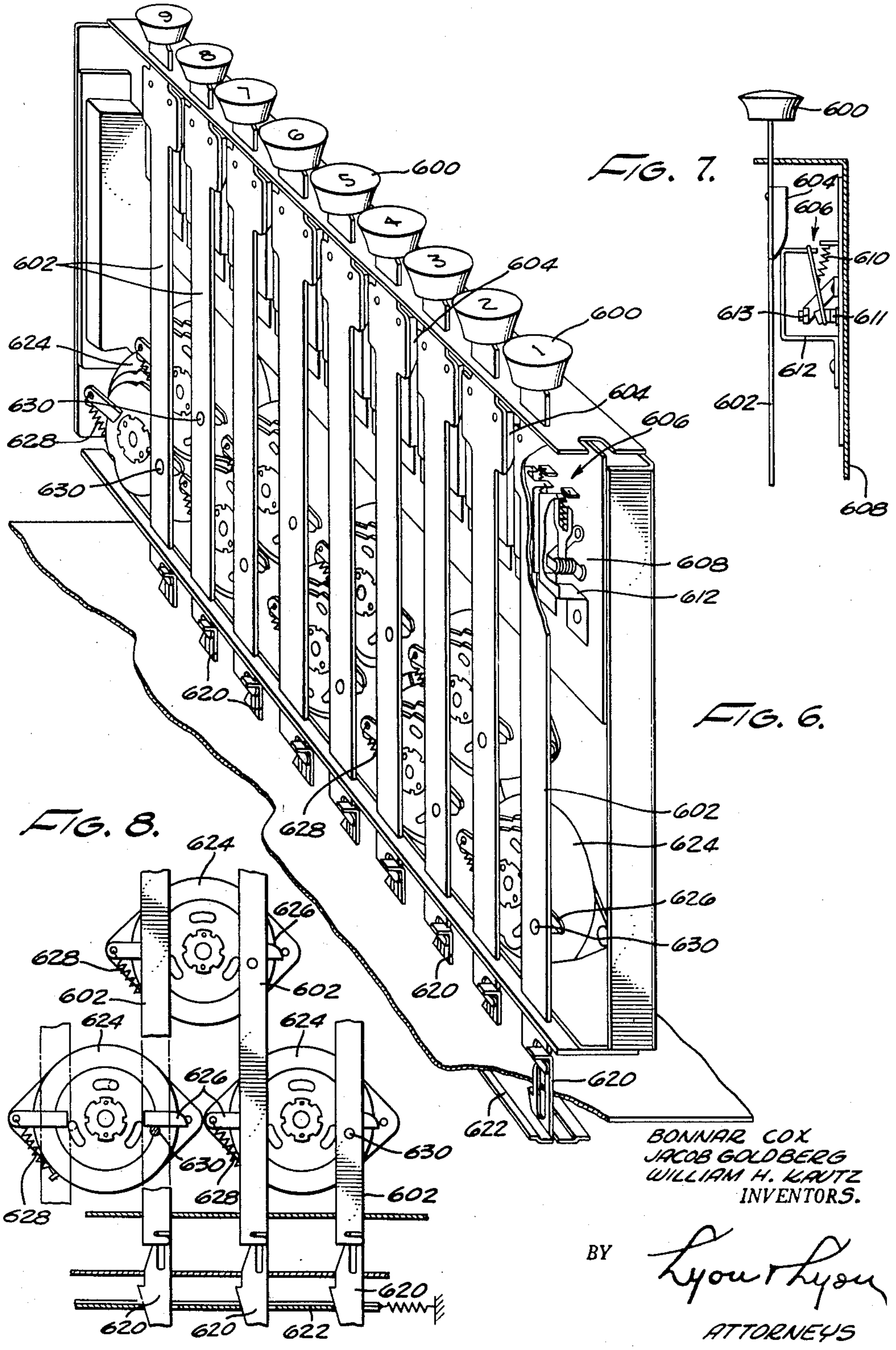
Figure 6 is an illustration in perspective of the mechanical arrangement of one column of keys at a keyboard in accordance with the embodiment of the invention.
Figure 7 represents the detail of the switches at one key.
Figure 8 shows the arrangement for mounting the solenoids to actuate the keys of the keyboard.

Figure 6 is a perspective view of the mechanical arrangement for a column of keys in accordance with this invention. Figure 7 shows in section a single key. Figure 8 shows the disposition of the solenoids.

As shown, there are nine keys in a column. Each key includes the cap 600, on which the number is printed. This is connected to a key bar 602 which moves when a key is depressed. Each key bar has a cam 604 mounted thereon and movable therewith. A double-pole double-throw switch 606 is mounted on a wall 608 to be adjacent the cam. The movable arms of the double-pole double-throw switch are urged by springs 610 to make contact with one pair of terminals 611 when a key is not depressed.

When a key is depressed, the cam 604 presses actuating member 612. This causes the switch movable arms to make contact with a second pair of terminals 613. A depressed key is held down mechanically until released. This is effectuated in well-known manner by having an extension member 620 movably attached to a key bar 602. This member extends to and actuates a printing attachment where required. This member is notched so that it can pass one way through an opening in a latch bar 622 but cannot return until the latch bar is moved to allow the notch to pass back again. These latching and unlatching details are well known, and a discussion thereon will accordingly not be given here.

A rotary solenoid 624 is provided for each key bar. These are mounted on the wall 608 in staggered fashion, to enable the fitting of the required number of solenoids.

Each rotary solenoid has a shaft 626 extending on either side of its rotary member (not shown). This is the part of the rotary solenoid which moves in a circular path when the solenoid is excited. A spring 628 is attached between the solenoid body and one end of the shaft 626 to maintain it biased to a starting position. Each key bar 602 has a pin 630 which extends toward and makes contact with the other end of the shaft 626. Therefore, when a solenoid is excited its shaft pushes downward on the pin of the associated key bar, thereby moving the assembly downward in the same manner as if it were depressed manually.

There has been shown and described hereinabove a novel and useful arrangement for entering and reading out data from the memory of an information-handling system. This system enables the data to be checked for errors of entry or readout while simultaneously checking the apparatus or circuit paths employed in the process. All this is accomplished with the available equipment and without the employment of an additional apparatus for error-detection purposes by using the usual data-input and data-output paths of a system and what can be considered as storage means at both path ends, and comparing the data store at the input end to the input path with that received from the output path which has been transferred thereinto from the device at the end of the data-input path.

We claim:

1. A system for detecting errors in transferring data from the keys of a keyboard to a storage device comprising a first and a second contact for each key of said keyboard, means at said keyboard for closing a set of said first contacts and a set of said second contacts responsive to actuation of the keys of said keyboard in accordance with the data desired to be transferred, means responsive to said first set of closed contacts to transform said data from the form presented on said keyboard into the coded form required for entry into said storage device, means to enter said coded data into said storage device, a register, means to read said data from said storage device into said register, means coupled to said register to transform said data into said keyboard form, means to apply output from said means coupled to said register to transform said data to said keyboard to close others of said second contacts when said output differs from the data represented by said actuated keys, and means responsive to others of said second contacts being closed to indicate an error.

2. A system as recited in claim 1 wherein said means responsive to said first set of closed contacts to transform said data into the coded form required for entry into said memory includes a decimal-to-binary code converter, and means to convert the output of said code converter into a serial pulse train.

3. A system for detecting errors in transferring data to a storage device from the keys of a keyboard having columns of keys wherein data is entered by depressing a different key in each column in accordance with the data to be entered, said system comprising means to provide a decimal output from each column of keys representative of a depressed key, means to convert the output of each column from decimal-to-binary form, means to convert said binary form for all of said columns into a serial pulse train preserving digit significance, means to store said serial pulse train in said storage device, register means, means to read said serial pulse train from said storage device into said register means to be staticized, means to convert said staticized serial pulse train into a decimal form, means to apply said last-named decimal form to said respective columns of keys on said keyboard, and means to indicate a difference between the decimal output from said keyboard representative of said depressed keys and the decimal form applied to said keyboard.

4. A system as recited in claim 3 wherein said means to provide a decimal output from each column of keys representative of a depressed key includes for each key a first switch movable arm, a first terminal and a second terminal, said switch arm being in contact with said first terminal when said key is not depressed, means to move said first movable arm to contact said second terminal when said key is depressed, each column of keys including a desired number of keys respectively being numbered in series, means connecting the first movable switch arm associated with each key in a column to the first terminal associated with each key in the same column which is the next lower in said series, a source of power, and means to apply said source to the first movable switch arm associated with the lowest key in said series to derive a decimal output from all said second terminals and the first terminal associated with the highest numbered key in said series.

5. A system as recited in claim 3 wherein said means to indicate a difference between the decimal output from said keyboard and the decimal form applied to said keyboard includes for each key a second movable arm, a third terminal and a fourth terminal, said second switch arm being in contact with said third terminal when its associated key is not depressed, means to move said second switch arm to contact said fourth terminal when its associated key is depressed, each column of keys including a desired number of keys respectively being numbered in series, means connecting the second movable switch arm associated with each key in a column in said series to the third terminal associated with the key which is the next lower in said series, a relay coupled to the second movable arm associated with the lowest numbered key in said series, a separate solenoid means coupled to each of said fourth terminals, each said solenoid having means then excited to pull down the key with which it is associated, means to apply said decimal form to all said fourth terminals and the third terminal associated with the highest numbered one of said keys in each column whereby each said relay is operated if there is no difference and one of said solenoids is operated if there is a difference corresponding to said difference.

6. A system for detecting errors in transferring data from a storage device where it is stored in binary code to an output device requiring a decimal-code input comprising a first register, means to enter said data from said storage device to said first register, means to convert said data in said first register into decimal code, means to apply said decimal-coded data to said output device, a decimal-to-binary code-converting network, means in said output device to apply said decimal-coded data to said network, a second register, means to enter the output of said network into said second register, and means to compare the contents of said first and second registers to determine whether there is a difference therebetween.

References Cited in the file of this patent

UNITED STATES PATENTS

| | | |
|---|---|---|
| 1,930,525 | Levy | Oct. 17, 1933 |
| 2,242,196 | Thompson et al. | May 13, 1941 |
| 2,495,705 | Devauz | Jan. 31, 1950 |
| 2,640,872 | Hartley | June 2, 1953 |
| 2,688,656 | Wright | Sept. 7, 1954 |
| 2,700,755 | Burkhart | Jan. 25, 1955 |
| 2,702,380 | Brustman | Feb. 15, 1955 |
| 2,724,739 | Harris | Nov. 22, 1955 |